United States Patent Office 2,864,840
Patented Dec. 16, 1958

2,864,840

PROCESS FOR PRODUCING ORGANIC ESTERS OF NITROPHENYL DICHLOROACETAMIDO PROPANE DIOLS

William H. Edgerton, Huntington Woods, Mich., assignor to Parke, Davis & Company, Detroit, Mich., a corporation of Michigan No Drawing. Application March 28, 1955
Serial No. 497,433

12 Claims. (Cl. 260—404)

This invention relates to a process for producing certain therapeutically valuable esters. More particularly, the present invention relates to a method for producing 3-O-acyl esters of 1-p-nitrophenyl-2-dichloroacetamidopropane-1,3-diol having the general formula,

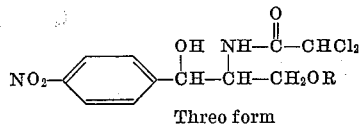

Threo form where R is a palmitoyl or stearoyl group.

Heretofore, esters having the above formula have been prepared by methods involving ring-nitration of certain tri-acylated 1-phenyl-2-aminopropane-1,3-diols such as the triacetate of 1-phenyl-2-aminopropane-1,3-diol followed by complete hydrolysis, N-dichloroacetylation, and esterification at the 3-position. The present method possesses a substantial advantage over the known methods in that a high yield of the desired esters is obtained while at the same time the complete hydrolysis step and the subsequent steps of introducing N-dichloroacetyl and 3-ester groups are eliminated.

From the following description it will be apparent to those skilled in the art that the starting materials, intermediates and ester products of the invention exist in structural or diastereoisomeric as well as optical isomeric form. The present invention is concerned with compounds having the "threo" diastereoisomeric as distinguished from the "erythro" diastereoisomeric form. The groups on the two asymmetric carbon atoms of such threo diastereoisomers have the same relative spacial configuration or arrangement as the groups on the two asymmetric carbon atoms of pseudo ephedrine and threose.

Because of the difficulty in representing these structural differences in graphic formulae, the customary structural formulae will be used in both the specification and claims and a notation placed below or to the side of the formula to designate the particular structural and optical configuration of the compound. Where the notation "threo form" appears, as it does above, the formula is to be interpreted in its generic sense, that is, as representing the "D-threo" and "L-threo" isomers in separated form as well as the racemic mixture thereof. Such a formula does not merely represent the optical mixture. In the specific formulae the notation [+] will be used to designate dextro optical rotation and the notation [−] to designate levo optical rotation.

In accordance with the invention threo-1-p-nitrophenyl-2-dichloroacetamido-3-acyloxypropane-1-ol compounds having the formula given above are produced by ring-nitrating a 1-phenyl-1-acyloxy-2-dichloroacetamido-3-OR-substituted propane of formula,

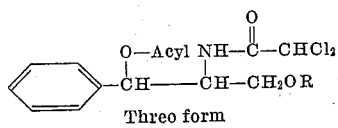

Threo form to produce a 1-p-nitrophenyl-1-acyloxy-2-dichloroacetamido-3-OR-substituted propane of formula,

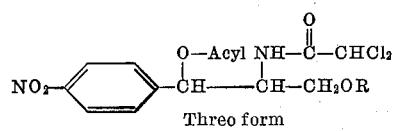

Threo form and subjecting the latter compound to mild, or selective, hydrolysis; where Acyl denotes an aliphatic carboxylic acid acyl group containing 1 to 18 carbon atoms such as formyl, acetyl, propionyl, palmitoyl, stearoyl or a halogen substituted lower aliphatic carboxylic acid acyl group such as chloroacetyl, dichloroacetyl, dibromoacetyl, α-dichloropropionyl, etc., and R has the same significance as given above.

The transformations involved in the process can be diagrammatically illustrated as follows:

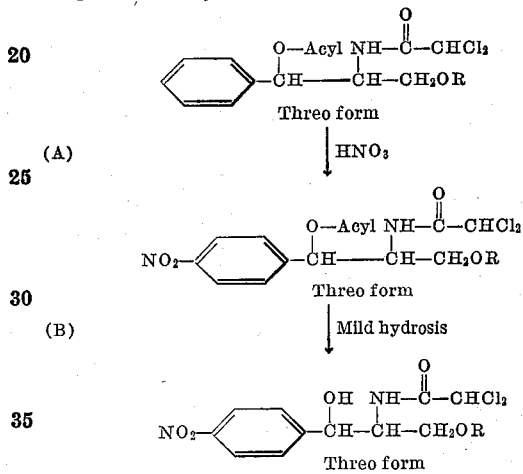

where R and Acyl have the same significance as given above.

The nitration in accordance with the transformation designated as A in the above diagram can be carried out using a mixture of concentrated nitric and sulfuric acids; 100% nitric acid; or fuming nitric acid. The temperature of the reaction mixture is preferably maintained below 0° C. but in practice higher temperatures up to 25° C. are satisfactory. Temperatures as low as −50° can be employed but there is no particular advantage in employing a temperature lower than −25° C.

The transformation designated as B in the above diagram involves selectively removing the 1-O-acyl group present in the 1-p-nitrophenyl-1-acyloxy-2-dichloroacetamido-3-OR-propane, by hydrolysis. This is accomplished by treating the propane compound with an alkaline agent dissolved in a water-miscible organic solvent in the presence of water at a temperature between about −20 to +25° C., and preferably between −5 to +10° C. Among the many alkaline agents which can be used are the alkali metal hydroxides and alcoholates, the alkaline earth metal hydroxides and alcoholates, the alkali metal carbonates, and the alkali metal bicarbonates. Among the many suitable organic solvents for the reaction are lower aliphatic alcohols such as methanol, ethanol, isopropanol, isobutanol; lower aliphatic ketones such as acetone, methyl ethyl ketone; cyclic ethers such as dioxane; and secondary and tertiary aliphatic amides such as methyl- and dimethyl-formamide. The preferred method of carrying out the selective hydrolysis is to maintain the temperature in the neighborhood of 5° C. and to use substantially stoichiometric proportions of the alkaline agent and the 1-p-nitrophenyl-1-acyloxy-2-dichloroacetamido-3-OR-propane compound.

The invention is illustrated by the following examples.

*Example 1*

(a) 3 grams of D-threo-1-phenyl-1-dichloroacetoxy-2-dichloroacetamido - 3 - palmitoyloxypropane are slowly added to 30 ml. of fuming nitric acid at a temperature of -20° C. The reaction mixture is allowed to warm to —5° C. and is quenched by pouring into a slurry of ice and ethyl acetate. The mixture is neutralized by the addition of solid sodium carbonate and the ethyl acetate layer is separated, dried and concentrated by evaporation. The residual syrup is purified by crystallization from aqueous ethanol; M. P. 71° C., $[\alpha]_D^{26} = -18°$ (4% in ethyl acetate). The product, D-(—)-threo-1 - p-nitrophenyl-l-dichloracetoxy-2-dichloroacet - amido - 3-palmitoyloxypropane, has the formula,

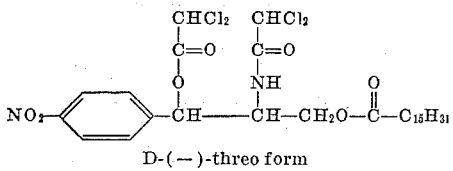

D-(—)-threo form (b) A solution of 6.7 g. of D-(—)-threo-1-p-nitrophenyl-1-dichloroacetoxy-2-dichloroacetamido - 3 - palmitoyloxypropane in 50 ml. of dimethyl-formamide is cooled to 5° C. and 10.1 ml. of 0.981 N sodium hydroxide is added dropwise with stirring. The mixture is quenched in 60 ml. of cold water. The crystalline product which separates, D-(+)-threo-1-p-nitrophenyl-2-dichloracetamido-3-palmitoyloxypropane-1-ol, is purified by washing first with aqueous ethanol and then with iso-octane; M. P. 88–89° C. This product has the formula,

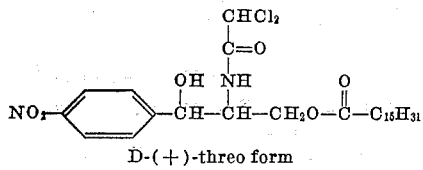

D-(+)-threo form

The starting material for 1(a) above can be prepared by reacting D-threo-1-phenyl-2-dichloroacetamido - propane-1,3-diol with an equivalent amount of palmitoyl chloride in a tertiary amide solvent in the presence of pyridine to obtain D-threo-1-phenyl-2-dichloroacetamido-3-palmitoyloxypropane-1-ol and reacting an anhydrous pyridine solution of the latter compound with an excess of dichloroacetyl chloride. The reaction product, D-threo-1-phenyl-1-dichloroacetoxy - 2 - dichloracetamido-3-palmitoyl-oxypropane, is recovered by filtration and purifiied by recrystallization from ethanol.

*Example 2*

(a) 4.2 grams of D-threo-1-phenyl-1 - acetoxy-2-dichloro-acetamido-3-palmitoyloxypropane are added portion wise to 35 ml. of fuming nitric acid at a temperature between about —15 to —20° C. After standing for five minutes, the mixture is allowed to warm to —5° C. and is quenched by pouring into a slurry of ice and ethyl acetate. The mixture is neutralized by the addition of solid sodium carbonate and the acetate layer is separated, dried and concentrated by evaporation. The residual syrup is washed with water and with petroleum ether and recrystallized from xylene; M. P. 73° C., $[\alpha]_D^{26} = -14.5°$ (2% in ethyl acetate). This product, D-(—)-threo-1-p-nitrophenyl-1-acetoxy - 2 - dichloroacetamido-3-palmitoyloxypropane, has the formula,

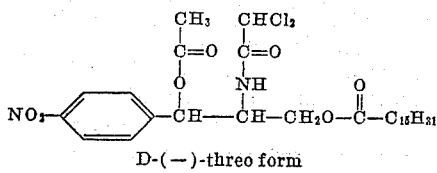

D-(—)-threo form (b) A solution of 6 g. of D-(—)-threo-1-p-nitrophenyl-1-acetoxy-2 - dichloroacetamido-3 - palmitoyloxypropane in 50 ml. of absolute ethanol is cooled to 5° C. and 0.17 g. of sodium ethylate in ethanol is added. After standing at a temperature of 5° C. for twenty minutes, 60 ml. of water is added. The crystalline product which separates is recrystallized from xylene; M. P. 91–92° C. The product, D-(+)-threo-1-p-nitrophenyl - 2 - dichloroacetamido-3-palmitoyloxypropane - 1-ol, has the formula,

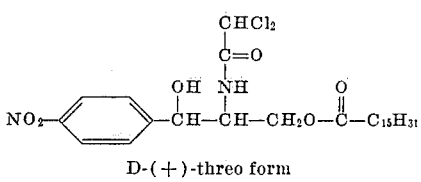

D-(+)-threo form

The starting material for 2(a) above can be prepared by reacting an anhydrous pyridine solution of D-threo-1-phenyl-2-dichloroacetamido-3-palmitoyloxypropane-1-ol with an excess of acetic anhydride. The reaction product, D-threo-1-phenyl - 1 - acetoxy - 2 - dichloroacetamido-3-palmitoyloxypropane, is recovered by filtration and purified by recrystallization from a mixture of ethanol and 2,2,4-trimethyl-pentane.

*Example 3*

(a) 3 grams of D-threo-1-phenyl-1-dichloroacetoxy-2-dichloroacetamido-3-stearoyloxypropane are added slowly to 30 ml. of fuming nitric acid at a temperature of —20° C. When the reaction is complete, the reaction mixture is quenched by pouring into a slurry of ice and ethyl acetate. The mixture is neutralized with sodium carbonate and the acetate layer is separated, dried and concentrated by evaporation. The residue is purified by recrystallization from aqueous ethanol. The product, D - (—) - threo-1-p-nitrophenyl - 1 - dichloroacetoxy - 2-dichloroacetamido-3-stearoyl-oxypropane, has the formula,

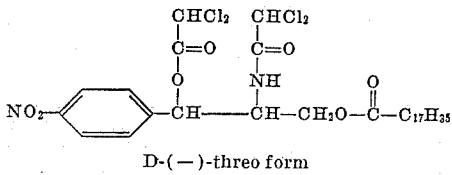

D-(—)-threo form (b) A solution of 7 g. of D-(—)-threo-1-p-nitrophenyl-1-dichloroacetoxy-2-dichloroacetamido - 3 - stearoyloxypropane in 50 ml. of dimethyl formamide is cooled to 5° C. and 10 ml. of normal sodium hydroxide solution is added dropwise with stirring. The reaction mixture is quenched in 60 ml. of ice water. The crystalline product which separates, D-(+)-threo-1-p-nitrophenyl-2-dichloroacetamido-3-stearoyloxypropane, is collected and purified by washing with aqueous ethanol. The product has the formula,

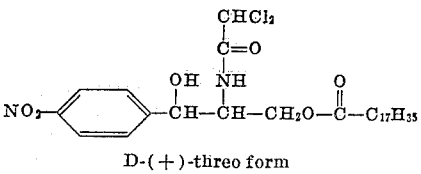

D-(+)-threo form

The starting material for 3(a) above can be prepared by successive stearoylation and dichloracetylation of D-threo-1-phenyl-2-dichloroacetamidopropane - 1,3 - diol in the same manner indicated for the preparation of the starting material of Example 1(a).

*Example 4*

(a) 4.2 grams of DL-threo-1-phenyl-2-dichloroacetamido-1,3-dipalmitoyloxypropane are added slowly to 30 ml. of fuming nitric acid at a temperature of —20° C.

The temperature of the reaction mixture is allowed to rise to 0° C., and the mixture is quenched in a slurry of ice and ethyl acetate and neutralized with sodium carbonate. The organic layer is separated, dried and concentrated in vacuo. The residual product is purified by recrystallization from aqueous alcohol. The product, DL-threo-1-p-nitrophenyl - 2 - dichloroacetamido - 1,3 - dipalmitoyloxypropane, has the formula, $$NO_2-\text{C}_6H_4-\underset{\underset{\underset{C=O}{O}}{|}}{CH}-\underset{\underset{\underset{C=O}{NH}}{|}}{CH}-CH_2O-\underset{\underset{}{O}}{\overset{\overset{}{O}}{C}}-C_{15}H_{31}$$
with $C_{15}H_{31}-C(=O)-O-$ and $CHCl_2-C(=O)-NH-$ substituents DL-threo form (b) 8 grams of DL-threo-1-p-nitrophenyl-2-dichloroacetamido-1,3-dipalmitoyloxypropane in 75 ml. of ethanol is cooled to 0° C. and 0.17 g. of sodium ethylate in ethanol is added. After standing for twenty minutes at the same temperature, the reaction mixture is quenched with 60 ml. of cold water. The crystalline product which separates, DL-threo-1-p-nitrophenyl-2-dichloroacetamido-3-palmitoyloxypropane-1-ol, has the formula, $$NO_2-C_6H_4-\underset{OH}{CH}-\underset{NH-C(=O)-CHCl_2}{CH}-CH_2O-\overset{O}{\overset{\|}{C}}-C_{15}H_{31}$$

DL-threo form

The starting material for 4(a) above can be prepared by reacting DL-threo-1-phenyl-2-dichloroacetamido-propane-1,3-diol with at least two equivalents of palmitoyl chloride in benzene at elevated temperature. The reaction product is isolated by concentrating the reaction mixture in vacuo and recrystallizing the residual product from ethanol.

I claim:
1. Process for producing a compound of formula,

$$NO_2-C_6H_4-\underset{OH}{CH}-\underset{NH-\overset{O}{\overset{\|}{C}}-CHCl_2}{CH}-CH_2OR$$

Threo form which comprises ring-nitrating at a temperature below 0° C. a 1-phenyl-1-acyloxy-2-dichloroacetamido-3-OR-substituted propane of formula, $$C_6H_5-\underset{O-Acyl}{CH}-\underset{NH-\overset{O}{\overset{\|}{C}}-CHCl_2}{CH}-CH_2OR$$

Threo form to produce a 1-p-nitrophenyl-1-acyloxy-2-dichloroacetamido-3-OR-substituted propane of formula, $$NO_2-C_6H_4-\underset{O-Acyl}{CH}-\underset{NH-\overset{O}{\overset{\|}{C}}-CHCl_2}{CH}-CH_2OR$$

Threo form and subjecting the latter compound to mild hydrolysis with a strong alkaline agent at a temperature in the neighborhood of 5° C.; where Acyl is a member of the group consisting of aliphatic carboxylic acid acyl radicals containing 1 to 18 carbon atoms and halogen substituted lower aliphatic carboxylic acid acyl radicals and R is a member of the group consisting of palmitoyl and stearoyl radicals.

2. Process for producing threo-1-p-nitrophenyl-2-dichloroacetamido-3-palmitoyloxypropane-1-ol which comprises reacting a 1-phenyl-1-dichloroacetoxy-2-dichloroacetamido-3-palmitoyloxypropane of formula, $$C_6H_5-\underset{\underset{\underset{C=O}{O}}{|}}{\underset{CHCl_2}{CH}}-\underset{NH-\overset{O}{\overset{\|}{C}}-CHCl_2}{CH}-CH_2O-\overset{O}{\overset{\|}{C}}-C_{15}H_{31}$$

Threo form with a nitrating agent at a temperature below 0° C. to produce a 1-p-nitrophenyl-1-dichloroacetoxy-2-dichloroacetamido-3-palmitoyloxypropane of formula, $$NO_2-C_6H_4-\underset{\underset{\underset{C=O}{O}}{|}}{\underset{CHCl_2}{CH}}-\underset{NH-\overset{O}{\overset{\|}{C}}-CHCl_2}{CH}-CH_2-O-\overset{O}{\overset{\|}{C}}-C_{15}H_{31}$$

Threo form and subjecting the latter compound to hydrolysis with an alkaline agent at a temperature below 25° C.

3. Process for producing threo-1-p-nitrophenyl-2-dichloroacetamido-3-stearoyloxypropane-1-ol which comprises reacting a 1-phenyl-1-dichloroacetoxy-2-dichloroacetamido-3-stearoyloxypropane of formula, $$C_6H_5-\underset{\underset{\underset{C=O}{O}}{|}}{\underset{CHCl_2}{CH}}-\underset{NH-\overset{O}{\overset{\|}{C}}-CHCl_2}{CH}-CH_2-O-\overset{O}{\overset{\|}{C}}-C_{17}H_{35}$$

Threo form with a nitrating agent at a temperature below 0° C. to produce a 1-p-nitrophenyl-1-dichloroacetoxy-2-dichloroacetamido-3-stearoyloxypropane of formula, $$NO_2-C_6H_4-\underset{\underset{\underset{C=O}{O}}{|}}{\underset{CHCl_2}{CH}}-\underset{NH-\overset{O}{\overset{\|}{C}}-CHCl_2}{CH}-CH_2O-\overset{O}{\overset{\|}{C}}-C_{17}H_{35}$$

Threo form and subjecting the latter compound to hydrolysis with an alkaline agent at a temperature below 25° C.

4. Process for producing a threo-1-p-nitrophenyl-2-dichloroacetamido-3-acyloxypropane-1-ol compound of formula, $$NO_2-C_6H_4-\underset{OH}{CH}-\underset{NH-\overset{O}{\overset{\|}{C}}-CHCl_2}{CH}-CH_2OR$$

Threo form which comprises subjecting a 1-p-nitrophenyl-1-acyloxy-2-dichloroacetamido-3-OR-substituted propane of formula, $$NO_2-C_6H_4-\underset{O-Acyl}{CH}-\underset{NH-\overset{O}{\overset{\|}{C}}-CHCl_2}{CH}-CH_2OR$$

Threo form to hydrolysis with an alkaline agent at a temperature below 25° C.; where Acyl is a member of the group consisting of aliphatic carboxylic acid acyl radcals contanng sisting of aliphatic carboxylic acid acyl radicals containing 1 to 18 carbon atoms and halogen substituted lower aliphatic carboxylic acid acyl radicals and R is a member of the group consisting of palmitoyl and stearoyl radicals.

5. Process for producing threo-1-p-nitrophenyl-2-dichloroacetamido-3-palmitoyloxypropane-1-ol, which comprises subjecting 1-p-nitrophenyl-1-dichloroacetoxy-2-dichloroacetamido-3-palmitoyloxypropane to hydrolysis with an alkaline agent at a temperature below 25° C.

6. Process for producing threo-1-p-nitrophenyl-2-dichloroacetamido-3-stearoyloxypropane-1-ol, which comprises subjecting 1-p-nitrophenyl-1-dichloroacetoxy-2-dichloroacetamido-3-stearoyloxypropane to hydrolysis with an alkaline agent at a temperature below 25° C.

7. A compound having the formula,

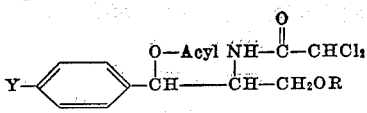

where Y is a member of the class consisting of H and NO₂, Acyl is a member of the group consisting of aliphatic carboxylic acid acyl radicals containing 1 to 18 carbon atoms and halogen substituted lower aliphatic carboxylic acid acyl radicals and R is a member of the group consisting of palmitoyl and stearoyl radicals.

8. A compound having the formula,

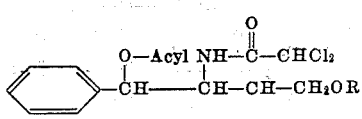

where Acyl is a member of the group consisting of aliphatic carboxylic acid acyl radicals containing 1 to 18 carbon atoms and halogen substituted lower aliphatic carboxylic acid acyl radicals and R is a member of the group consisting of palmitoyl and stearoyl radicals.

9. A compound having the formula,

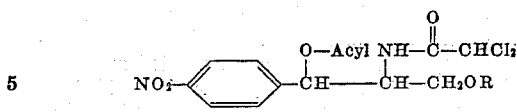

where Acyl is a member of the group consisting of aliphatic carboxylic acid acyl radicals containing 1 to 18 carbon atoms and halogen substituted lower aliphatic carboxylic acid acyl radicals and R is a member of the group consisting of palmitoyl and stearoyl radicals.

10. D-threo - 1 phenyl - 1 dichloroacetoxy - 2 - dichloroacetamido-3-palmitoyloxypropane.

11. D - (—) - threo - 1 - p - nitrophenyl - 1 - dichloroacetoxy-2-dichloroacetamido-3-palmitoyloxypropane.

12. DL - threo - 1 - p - nitrophenyl - 2 - dichloroacetamido-1,3-dipalmitoyloxypropane.

References Cited in the file of this patent
UNITED STATES PATENTS

| | | |
|---|---|---|
| 2,483,884 | Crooks et al. | Oct. 4, 1949 |
| 2,514,376 | Crooks et al. | July 11, 1950 |
| 2,662,906 | Edgerton | Dec. 15, 1953 |